US008175380B2

United States Patent
Kim et al.

(10) Patent No.: US 8,175,380 B2
(45) Date of Patent: May 8, 2012

(54) APPARATUS AND METHOD FOR IMPROVING TEXT RECOGNITION CAPABILITY

(75) Inventors: Sang-Ho Kim, Suwon-si (KR); Sang-Wook Oh, Ansan-si (KR); Yun-Je Oh, Suwon-si (KR); Seong-Taek Hwang, Pyeongtaek-si (KR)

(73) Assignee: Samsung Electronics Co., Ltd. (KR)

( * ) Notice: Subject to any disclaimer, the term of this patent is extended or adjusted under 35 U.S.C. 154(b) by 264 days.

(21) Appl. No.: 12/710,932

(22) Filed: Feb. 23, 2010

(65) Prior Publication Data

US 2010/0215261 A1 Aug. 26, 2010

(30) Foreign Application Priority Data

Feb. 23, 2009 (KR) .................. 10-2009-0014842

(51) Int. Cl.
*G06K 9/00* (2006.01)
*G06K 9/34* (2006.01)
(52) U.S. Cl. .................. 382/165; 382/176
(58) Field of Classification Search .......... 382/162, 382/164, 165, 170, 175, 176, 181, 182, 190, 382/200, 201, 254, 283; 358/462, 464; 345/22, 345/23, 635, 639
See application file for complete search history.

(56) References Cited

U.S. PATENT DOCUMENTS

| | | | | |
|---|---|---|---|---|
| 4,724,431 A | * | 2/1988 | Holtey et al. | 345/22 |
| 5,153,577 A | * | 10/1992 | Mackey et al. | 345/639 |
| 5,570,435 A | * | 10/1996 | Bloomberg et al. | 382/283 |
| 5,579,414 A | * | 11/1996 | Fast et al. | 382/254 |
| 5,619,592 A | * | 4/1997 | Bloomberg et al. | 382/175 |
| 5,778,092 A | * | 7/1998 | MacLeod et al. | 382/176 |
| 5,809,167 A | * | 9/1998 | Al-Hussein | 382/190 |
| 6,295,371 B1 | * | 9/2001 | Rucklidge et al. | 382/176 |
| 6,999,621 B2 | * | 2/2006 | Di Federico et al. | 382/176 |
| 2004/0057619 A1 | | 3/2004 | Lim et al. | |
| 2010/0215261 A1 | * | 8/2010 | Kim et al. | 382/165 |

FOREIGN PATENT DOCUMENTS

| | | |
|---|---|---|
| KR | 1020040023498 | 3/2004 |
| KR | 1020050052087 | 6/2005 |
| KR | 1020060105930 | 10/2006 |
| KR | 1020070065503 | 6/2007 |

* cited by examiner

*Primary Examiner* — Amir Alavi
(74) *Attorney, Agent, or Firm* — The Farrell Law Firm, P.C.

(57) ABSTRACT

Disclosed are an apparatus and a method for text recognition capability using a camera provided in a mobile communication terminal. Image pre-processing discriminates a text color and a text-background color in an input image, and unifies regions except the text into the text-background color, so that a text region and a background region surrounding the text region can be precisely separated. The image pre-processing method is adaptive to a photographing environment, whereby stable text recognition capability can be expected even if the photographing environment is variously changed.

12 Claims, 8 Drawing Sheets

APPARATUS AND METHOD FOR IMPROVING TEXT RECOGNITION CAPABILITY

PRIORITY

This application claims priority under 35 U.S.C. §119(a) to an application entitled "Apparatus And Method For Improving Text Recognition Capability" filed in the Korean Industrial Property Office on Feb. 23, 2009 and assigned Ser. No. 10-2009-0014842, the contents of which are incorporated herein by reference.

BACKGROUND OF THE INVENTION

1. Field of the Invention

The present invention relates generally to an apparatus and a method for extracting a text region for real time text recognition, and more particularly to an apparatus and a method for improving text recognition capability after automatically extracting a text region.

2. Description of the Related Art

Recently, due to the development of camera technology, a camera function has been incorporated in mobile communication terminals, such as PDAs (Personal Digital Assistants) and portable phones, making it possible to use the mobile communication terminal as an information acquisition device. Upon using a camera provided in such a mobile communication terminal, it may be easy to acquire any type of a text information image input in real time, and it may also be possible to obtain a text recognition result by recognizing and processing one or more texts from the input image. Such a text recognition method differs from existing scanner-based text recognition methods in that text, which is impossible to input with a scanner or from a paper document, can be easily acquired. In contrast the conventional method scans a paper document, recognizes the scanned file, and then converts the scanned file into a text file or an electronic document format.

The text recognition method using a camera as described above using text recognition fields which has been recently researched actively, since the method can be used in a mobile communication terminal which is not only capable of acquiring and recognizing a text regardless of a medium on which a text to be input is recorded, but also capable of being easily carried by a user. As an example of such application, there is a function for recognizing text, such as phone numbers and data, with a camera provided in a mobile communication terminal, wherein the function is called OCR (Optical Character Recognition).

Now, a conventional text recognition procedure will be described with reference to FIG. 1. Referring to FIG. 1, if image photographing for text recognition is initiated in step 102, the input image is converted into an image to be useful for text recognition, e.g. a gray image so as to acquire gray data, or subjected to necessary processing in step 110. In step 120, image pre-processing, such as adaptive binarization, text slant correction and separation of individual text, is executed. Then, the individual text is subjected to normalization processing, thereby being converted into a predetermined size in step 110, and features, each of which is capable of representing one normalized text image, are extracted in step 140. Then, in step 150, the extracted features are compared with previously stored features for individual text, respectively, and text having the most similar features are determined as a result of recognizing the input individual texts. Then, post-processing for recognition is executed which can correct or remove erroneously recognized or unrecognized texts.

A text recognition method using a camera has advantages in that a text image desired to be recognized can be easily input, and in that the result of recognizing the input text can be displayed in real time. However, since such a text recognition method is largely affected by ambient illumination unlike a text recognition method using a scanner, various pre-processing or post-processing functions shall be considered as important elements. In addition, the camera image text recognition has a problem in that stable recognition capability cannot be assured for the camera text recognition, due to the diversity of type of text to be text-input and text-recognized under unlimited environments.

Moreover, conventional techniques, such as business card recognition or other text recognition are typically used when text and the background thereof are relatively distinctly discriminated, the pattern of the background is simple, and the color of the text is darker than that of the background. However, the text images to be recognized in practice may be very diverse. In particular, frequently a background is not uniform, or the color of a text is brighter than that of the background. For example, text images of Chinese sign boards will often consist of a red background and a yellow text, and street signs or construction notice signs will often use a bright text and a dark background. For the text images inverted in terms of light and darkness of colors with respect to the background like this, it may be difficult to properly execute text recognition. For the convenience of description, such inverted relationship between the text image and the background in terms of light and darkness is referred to as "inverted" herein. Accordingly, in order to quickly determine if photographed text images are inverted, and then to execute inversion-processing as desired, what is needed is a technique different from existing methods used for text recognition. Inversion-processing is a measure for changing a color of a text to be darker than that of the background thereof and is used as such herein. That is, what is needed is an image pre-processing technique capable of recognizing and processing a text image having text surrounded by a non-uniform background and a text image having a text brighter than the background.

Therefore, in order to improve recognition capability for a text included in a camera input text image, what is needed are a pre-processing function adaptive to a camera characteristic and a photograph environment, and a post-processing function capable of confirming if a recognized text has been correctly recognized, and correcting incorrectly recognized text.

SUMMARY OF THE INVENTION

Accordingly, the present invention has been made to solve the above-mentioned problems occurring in conventional systems, and the present invention provides an apparatus and a method for improving capability for precisely extracting a text region, and then recognizing text in the extracted text region in a mobile communication terminal with a camera.

Also, the present invention provides an apparatus and a method for improving text recognition capability in a mobile communication terminal with a camera by providing a pre-processing function effective for an input image, which can correctly discriminate text and the background thereof.

In accordance with an aspect of the present invention, there is provided an apparatus for improving text recognition capability in a mobile communication terminal with a camera, including a text region detection unit which determines if text exists in an input image, determines the text color and the text-background color surrounding the text when text exists, and unifies background regions beyond the text region into the determined text-background color; an inversion-processing unit which determines if the text image with the unified background is inverted, and inversion-processes the text image when the text image is an inverted image; and a text recognition unit which recognizes the inverted text image or the text image with the unified background from the inversion-processing unit, and then outputs the result of recognition.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Figure 1:
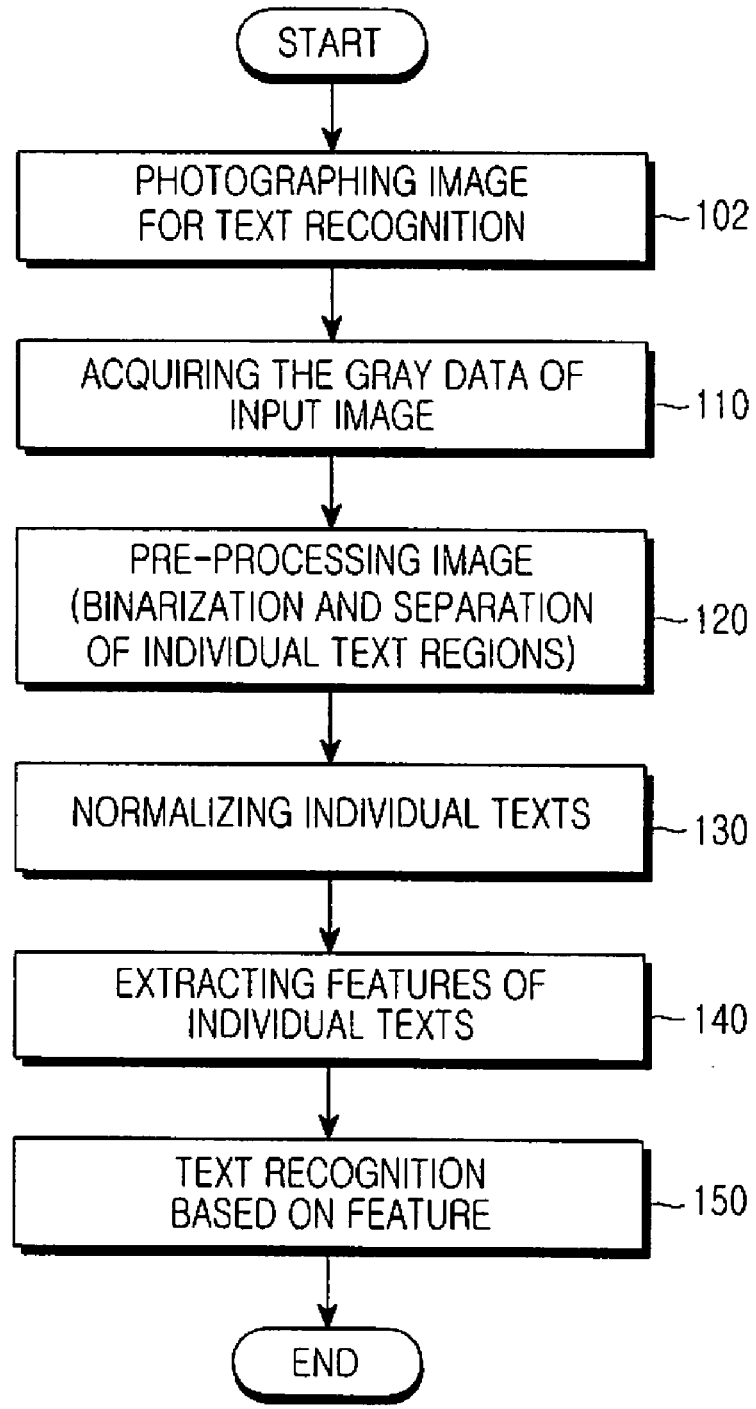
FIG. 1 is a flowchart showing a conventional text recognition procedure.

Hereinafter, certain embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The present invention improves text recognition using a camera provided in a mobile communication terminal. For this purpose, the present invention proposes an image pre-processing process capable of precisely recognizing a text region and a background region surrounding the text region by discriminating a text color and a text-background color from an input image, and then unifying the colors of the regions other than the text region into the text-background color. By proposing an image pre-processing method adaptive to a photographing environment according to the present invention, it is possible to obtain stable text recognition capability even if the photographing environment variably changes.

Components of a text recognition apparatus capable of implementing the above-mentioned functions, and the operations thereof will be described with reference to FIG. 2.

Figure 2:
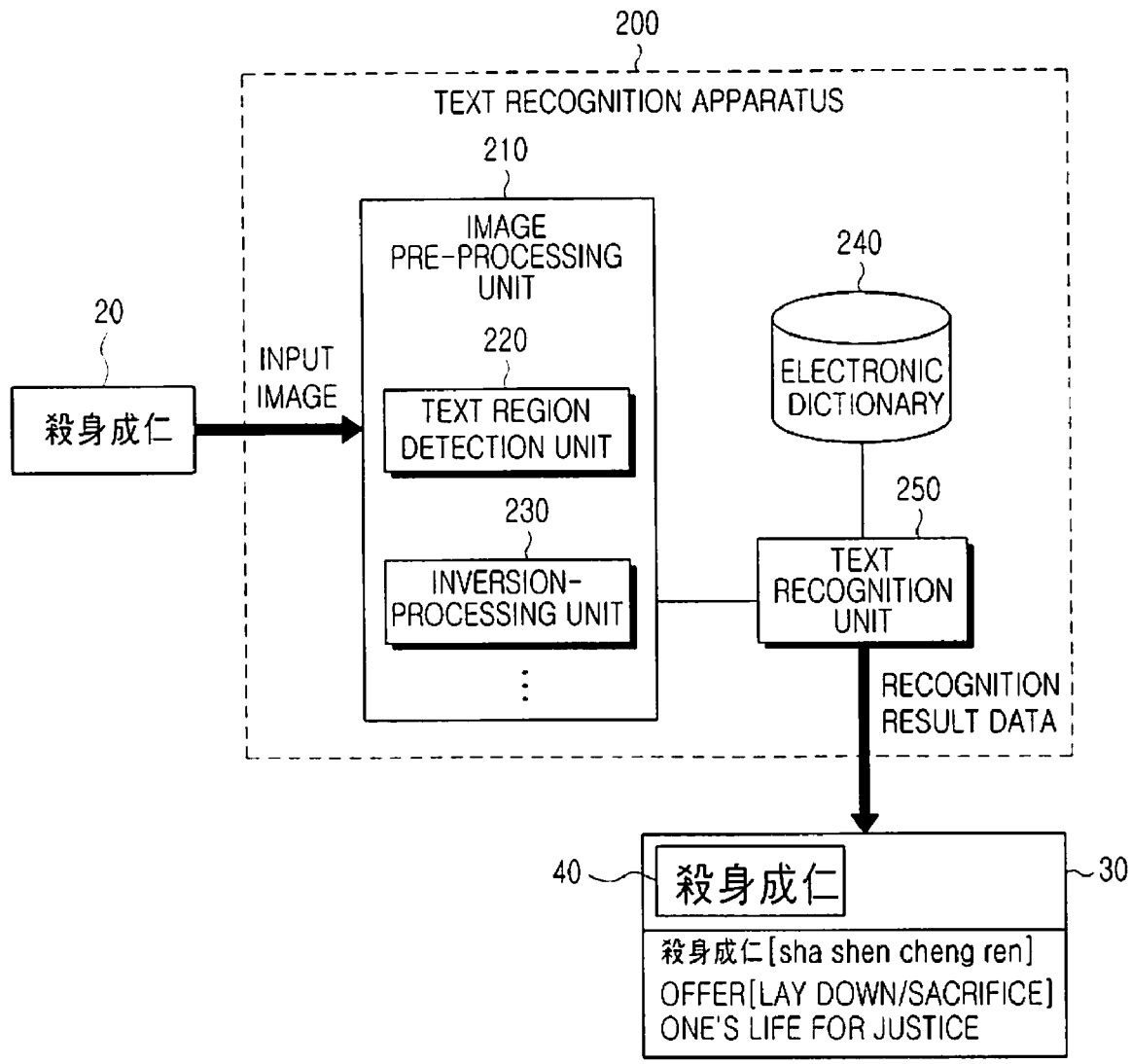
FIG. 2 is block diagram of a text recognition apparatus according to an embodiment of the present invention.

Referring to FIG. 2, a text recognition apparatus 200 is provided with a text reading program, so that the text recognition apparatus 200 executes functions for analyzing and separating an input image into two or more regions, and for recognizing one or more texts on the basis of the separated image. In order to provide such functions, the text recognition apparatus includes an image pre-processing unit 210, an electronic dictionary 240, and a text recognition unit 250.

At first, the image pre-processing unit 210 includes a text region detection unit 220 for detecting a text region from a real time image photographed by a camera when the image is input, and an inversion-processing unit 230 for processing inverted text. Inverted text is text having a color brighter than the background color thereof. Inversion-processing is a measure for changing the text to be darker than the background. Here, components required for removing blur, noise, illumination, shadow, reflection or the like, and adjusting slant may be implemented in the image pre-processing unit 210. Operation of the individual components of the image processing unit are apparent to a person skilled in the art, and the detailed description thereof is omitted for clarity.

The text region detection unit 220 determines if text exists in the input image, and when the text exists, the text region detection unit 220 discriminates a text region and a background region from the input image. Here, one or more text recognition parts are designated using a user guide marker. For example, a user designates a desired text recognition with the user guide marker by moving the user guide marker in a camera preview image.

Accordingly, if the user positions the user guide marker on a part desired to be text-recognized, the text region detection unit 220 determines if text exists on the position indicated by the user guide marker. Here, according to the movement of the user guide marker, a block in a word unit may be automatically designated, as indicated by reference numeral 20. However, the block designation method is not so limited.

If text exists in the input image, the text region detection unit 220 discriminates a text region and a background region from the input image. Here, the background region means a non-text region. The background region consists of a text-background region directly surrounding the text, and one or more indirect background regions which are not directly related to the text region. In order to discriminate the text region and the background region, the text region detection unit 220 discriminates the text color and the text-background color surrounding the text region, and then unifies the background region surrounding the text region. Specifically, the text region detection unit 220 extracts the text-background region, removes indirect background regions which are not important regions directly surrounding the text, and then unifies the color of the indirect background regions into the color of the text-background region. By simplifying the background region in this manner, it is possible to precisely extract only the text, even if the text is surrounded by a non-uniform background.

On the basis of the simplified background color and the text color, the inversion-processing unit 230 determines if the text color is brighter than the background color, and inversion-processes the light and dark of the text region having the unified background when it is determined that the text color is brighter than the background color.

The electronic dictionary 240 provides a dictionary function interworked with the text recognition unit 250, and stores translation data for recognized texts.

The text recognition unit 250 executes text extraction. For example, the text extraction may be executed by separating text and the background thereof, normalizing the size, type and font of the text, extracting text-specific vectors, recognizing the text using the text-specific vectors, and correcting an erroneously recognized text using dictionary information. The text recognition unit 250 may output an indication and a translation result for a recognized text in cooperation with the electronic dictionary 240 as a recognition result data. The present embodiment exemplifies a case in which an image 30 indicating, for example, a translation result is output as an example of application services using a search result of the electronic dictionary 240 matching with a text recognized in real time by applying a real time text region detection technique.

The text recognition apparatus 200 having the above-mentioned components discriminates text and a background, detects a corresponding text region to be recognized by automatically discriminating the text color and the background color, and actively determines if the background is brighter or the text color is brighter. Consequently, the inventive text recognition apparatus 200 executes a proper pre-processing function for the text image, whereby the text recognition capability can be further improved, wherein the above-mentioned image pre-processing technique will play a very important role in particular when real time text image recognition is executed in the mobile communication terminal.

For the above-mentioned image pre-processing, technical characteristics of the present invention may be divided into three steps as follows. The first step analyzes an input text image to discriminate a text color and a text-background color from a real time text image photographed by a camera. The second step unifies non-text-background regions into the text-background color on the basis of the text-background color with reference to the result of the first step. The third step determines if the input text image is an inverted image, and inversion-processing the text image when the input text image is determined as inverted one. Through this image pre-processing procedure, the present invention can obtain higher text recognition capability.

Now, the text recognition procedure according to an embodiment of the present invention will be described with reference to FIG. 3.

Figure 3:
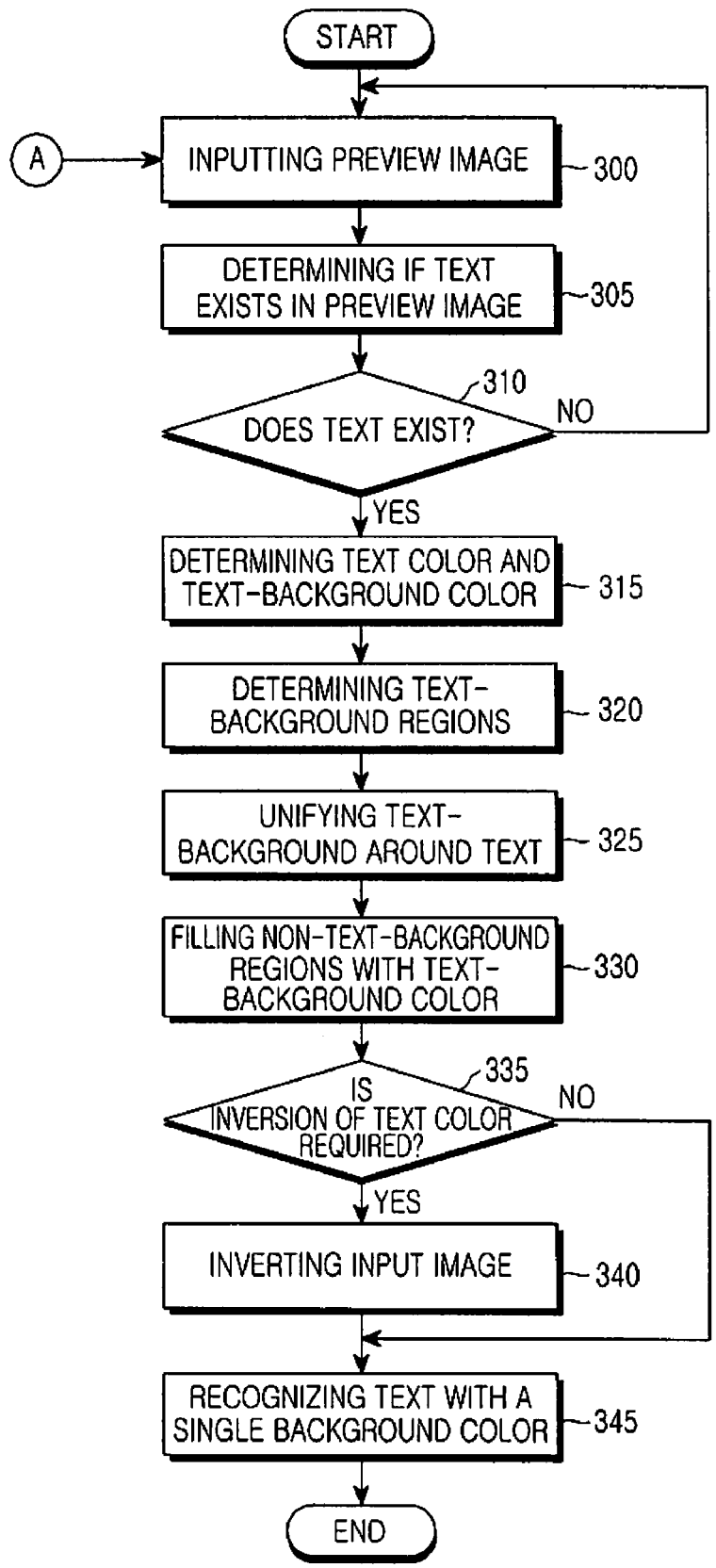
FIG. 3 is a flowchart showing a text recognition procedure according to an embodiment of the present invention.

Referring to FIG. 3, if a preview image is input in step 300, the text recognition apparatus determines if text exists in the preview image in step 305. Although it can be expected that the user will position the user guide marker at a text region desired to be recognized on the preview image by direct observation, the specific operation for determining if text exists in the present invention is described in detail with reference to FIG. 4.

If text is determined to exist in step 310, the text recognition apparatus determines the text color and the text-background color in step 315. In order to determine the text color and the text-background color, a center block is utilized with a predetermined size previously defined with reference to the user guide marker, and a moving block for up-down scanning. A histogram is acquired through the scanning of the moving block, and the text-background color is determined by analyzing the histogram, as described in detail with reference to FIG. 5. At this time, it is also possible to acquire edges beyond the histogram through the scanning of the moving block, so that the edges can be used for determining the text-background color.

Next, the text recognition apparatus determines the text-background region on the basis of the text-background color in step 320. Specifically, blobs of background regions having the same color with the text-background color are acquired, and then the blob adjacent to the text areas are determined as effective text-background regions, as described in detail with reference to FIG. 7. Then, the text recognition apparatus unifies the text-background around the text in step 325, and fills the other text-background regions, i.e. indirect background regions with the text-background color in step 330. Then, the text recognition apparatus determines if the inversion of the text color is necessary in step 335. If it is determined that the inversion is required, the text recognition apparatus inverts the input image in step 340, and recognizes the text having a single background color in step 345. Since the present invention makes uniform the regions beyond the text region and then executes the text recognition, it is possible to reduce erroneous recognition and to improve text recognition capability. Furthermore, since the inversion of a text image is determined when the text having the unified background is recognized, and inversion-processing is executed as required, it is possible to improve text recognition capability.

Figure 4:
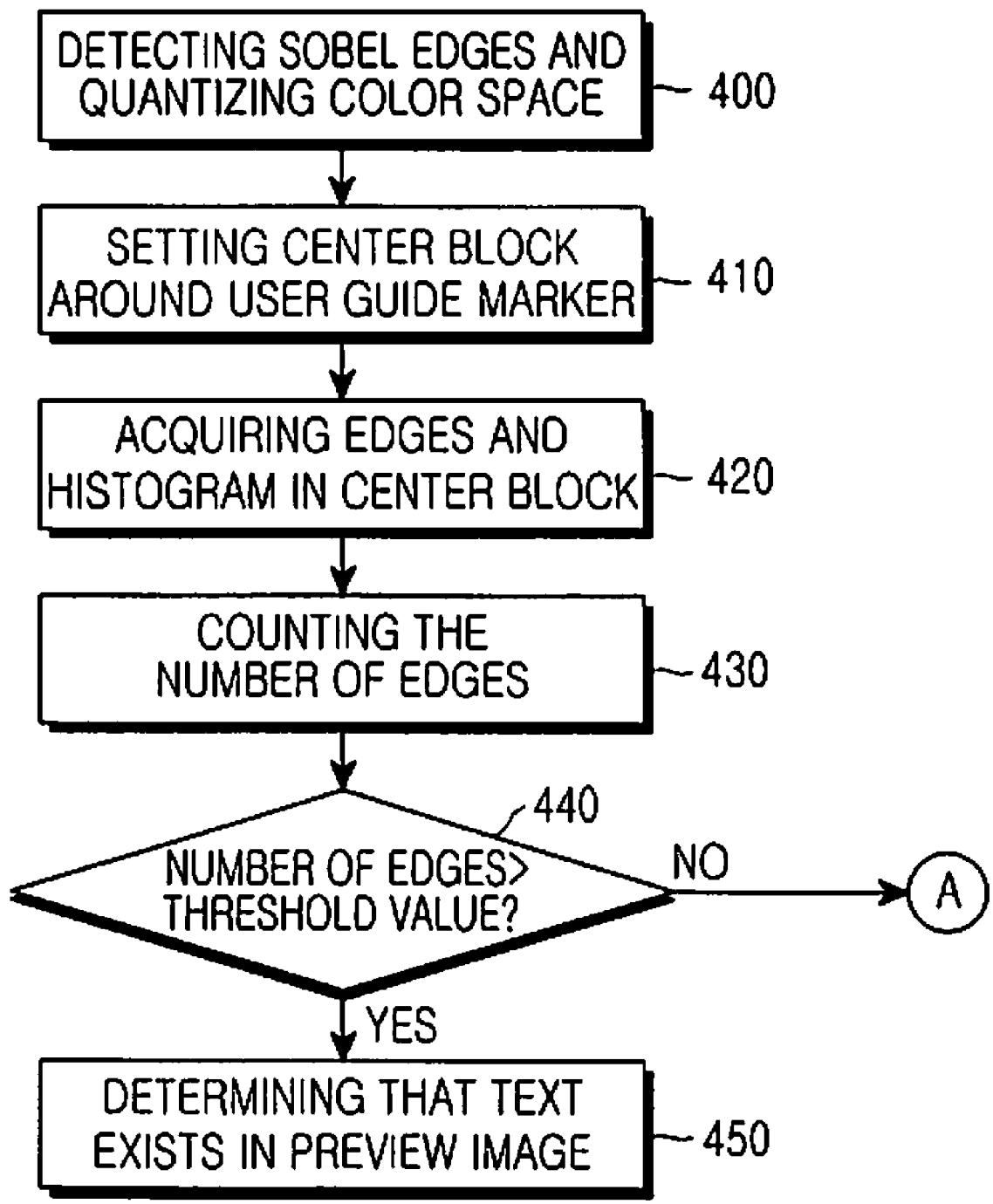
FIG. 4 is a flowchart for the procedure of determining if text exists, providing further detail regarding the flowchart of FIG. 3.

With reference to FIG. 4, the procedure of determining if text exists in the present invention will be described. Referring to FIG. 4, if a preview image is input, the text recognition apparatus executes Sobel edge detection, as known by those of skill in the art, and color space quantization in step 400. The Sobel edge detection and the color space quantization are executed to produce edges and a histogram which are characteristic information items to detect the existence of text.

Figure 6:
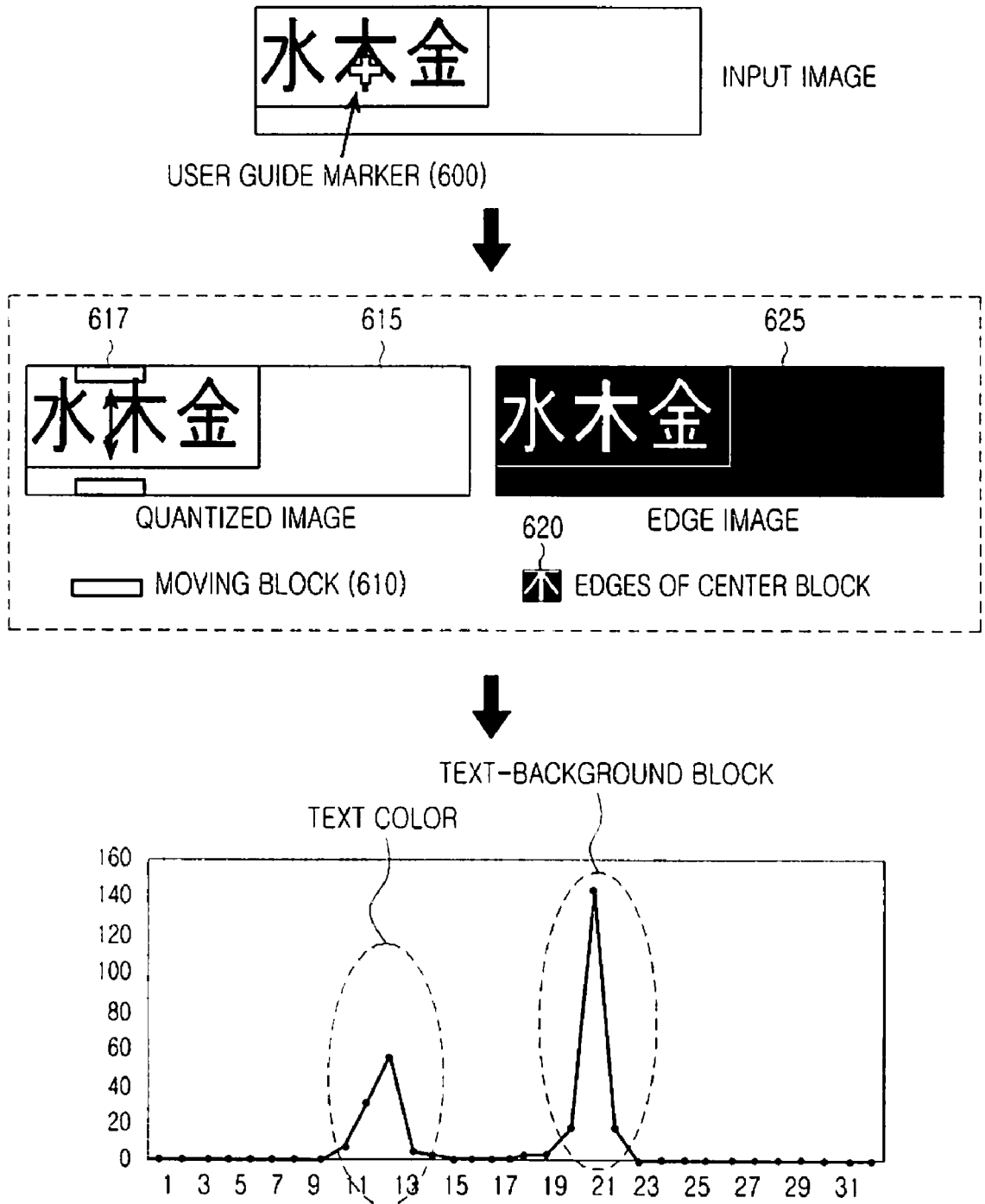
FIG. 6 is an exemplifying view for describing the procedure of FIG. 5.

Since it can be generally expected that the user will position the user marker at a location where text exists on the preview, it is sufficient if it is determined if text exists, only for predetermined parts centering around the user guide marker. For this purpose, the text recognition apparatus sets a center block with a predetermined size with reference to the user guide marker in the preview image in step 410. Then, the text recognition apparatus acquires edges and a histogram within the center block in step 420. For example, an image acquired through the Sobel edge detection from the input image where the user guide marker 600 is positioned, as shown in the upper image of FIG. 6 is indicated by reference numeral 625 in the middle of FIG. 6. In the edge image 625, the center block edges are indicated by reference numeral 620.

Here, when determining the existence of text, only the acquired edges are used. The acquired histogram is subsequently used for determining the text color and the text-background color. Therefore, the text recognition apparatus counts the number of edges acquired through image processing in the center block in step 430, and then determines if the number of edges exceeds a threshold value in step 440. If the number of edges does not exceed the threshold value, the text recognition apparatus returns to the step 300 of FIG. 3 and receives an image again. Whereas, if the number of edges exceeds the threshold value, the text recognition apparatus determines that text exists in the preview image in step 450.

Figure 5:
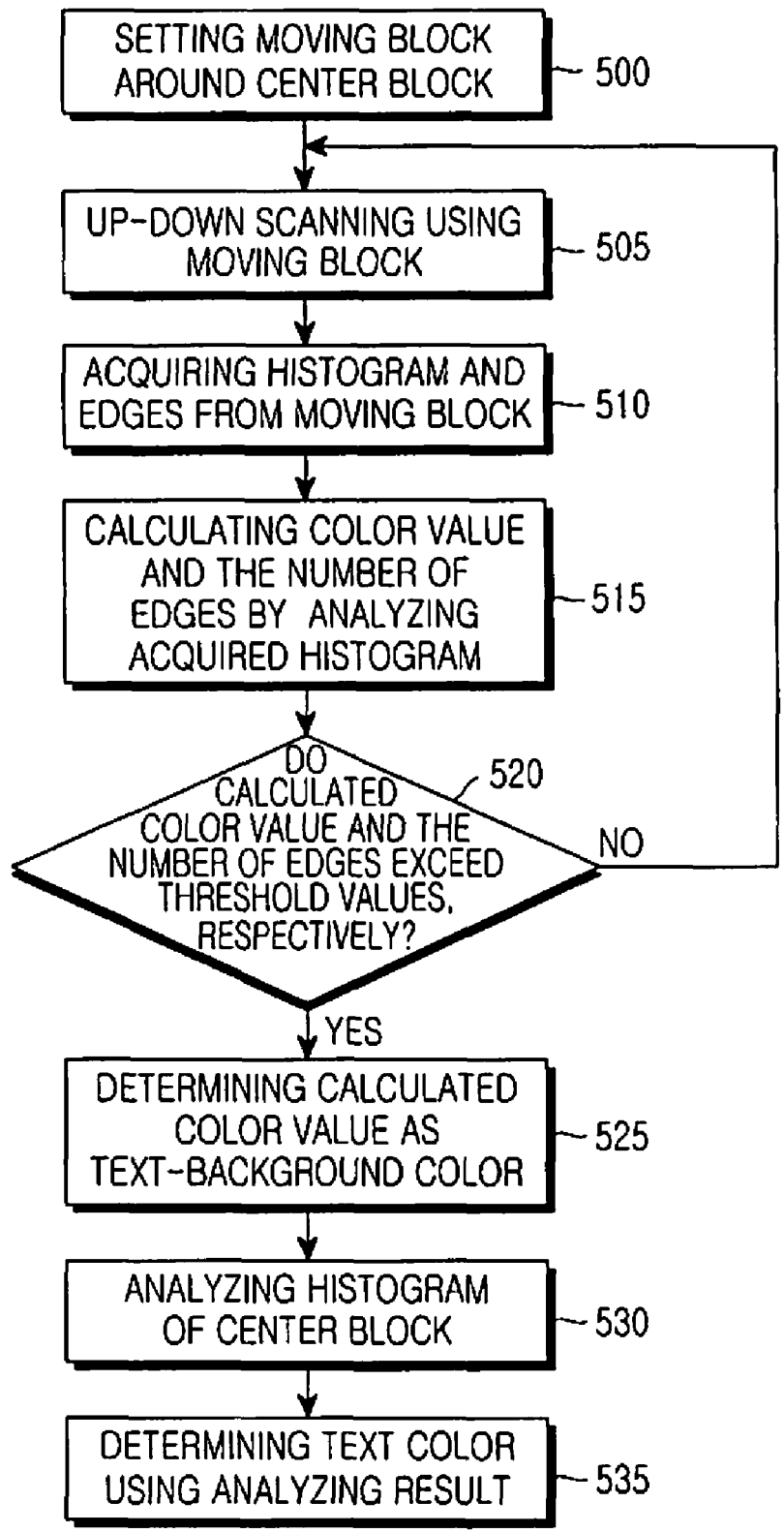
FIG. 5 is a flowchart showing details of the procedure to determine text color and background color in FIG. 3.

If it is determined that text exists as in the method of FIG. 4, the text color and the text-background color are determined. Referring to FIG. 5, the text recognition apparatus sets a moving block with a size of m×n around the center block in step 500. For example, if the user guide marker 600 is positioned on the input image as shown in FIG. 6a, the moving block 610 will initiate up-down scanning of the quantized image 615 of FIG. 6b adjacent to the center block. The text recognition apparatus executes up-down scanning using such a moving block in step 505, and thereby acquires a histogram and edges in the moving block in step 510. Next, in step 515, the text recognition apparatus analyzes the acquired histogram and calculates the color value for pixels in the moving block and the number of edges. In step 520, the text recognition apparatus determines if the color value and the number of edges as calculated exceed respective threshold values. If the color value and the number of edges as calculated do not exceed the respective threshold values, the up-down scanning of the moving block is continued. However, if they exceed the threshold values, the text recognition text determines the calculated color value as the text-background color in step 525.

If the text-background color is determined in step 525, the text recognition executes the histogram analysis of the center block in step 530, and determines the text color using the result of the analysis in step 535. For example, the lower image in FIG. 6 shows a histogram in the center block, wherein two peaks appear on x-axis indicating colors since a text and a text-background directly surrounding the text are positioned in the center block. Accordingly, it can be appreciated that the two peaks indicate the text color and the text-background color, respectively. Once the text-background color is determined, the text color is determined through the analysis of histogram in the center block. If the moving block is positioned at the location indicated by reference numeral 617 in FIG. 6, the peak for the text color does not appear in the moving block, and only one peak for the text-background color appears in the moving block.

Meanwhile, if the text color and the text-background color are determined as in the method of FIG. 5, a simplifying procedure for marking the non-text region, i.e. the background uniform entirely is executed so as to precisely detect only the text. Here, the input text image consists of a text region where text exists, a text-background region which directly surrounds the text, and one or more indirect background regions which are not directly related to the text region. In particular, the present invention recognizes the text from a unified background by filling the indirect background regions with the color of the text-background region, whereby it is possible to obtain higher text recognition capability. This procedure will be described with reference to FIG. 7.

Figure 7:
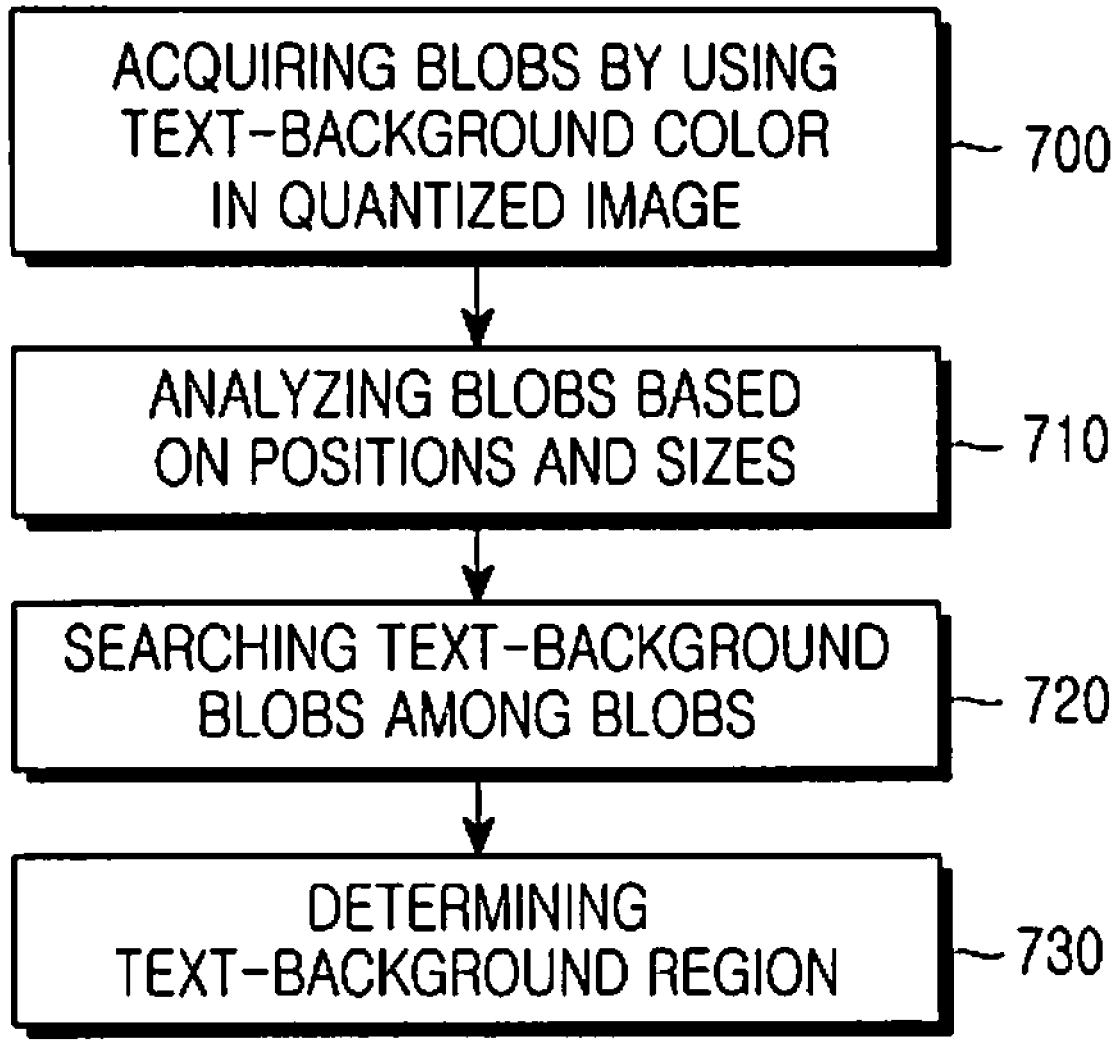
FIG. 7 is a flowchart showing details of the procedure to determine a text-background area in the procedure of FIG. 3.
Figure 8:
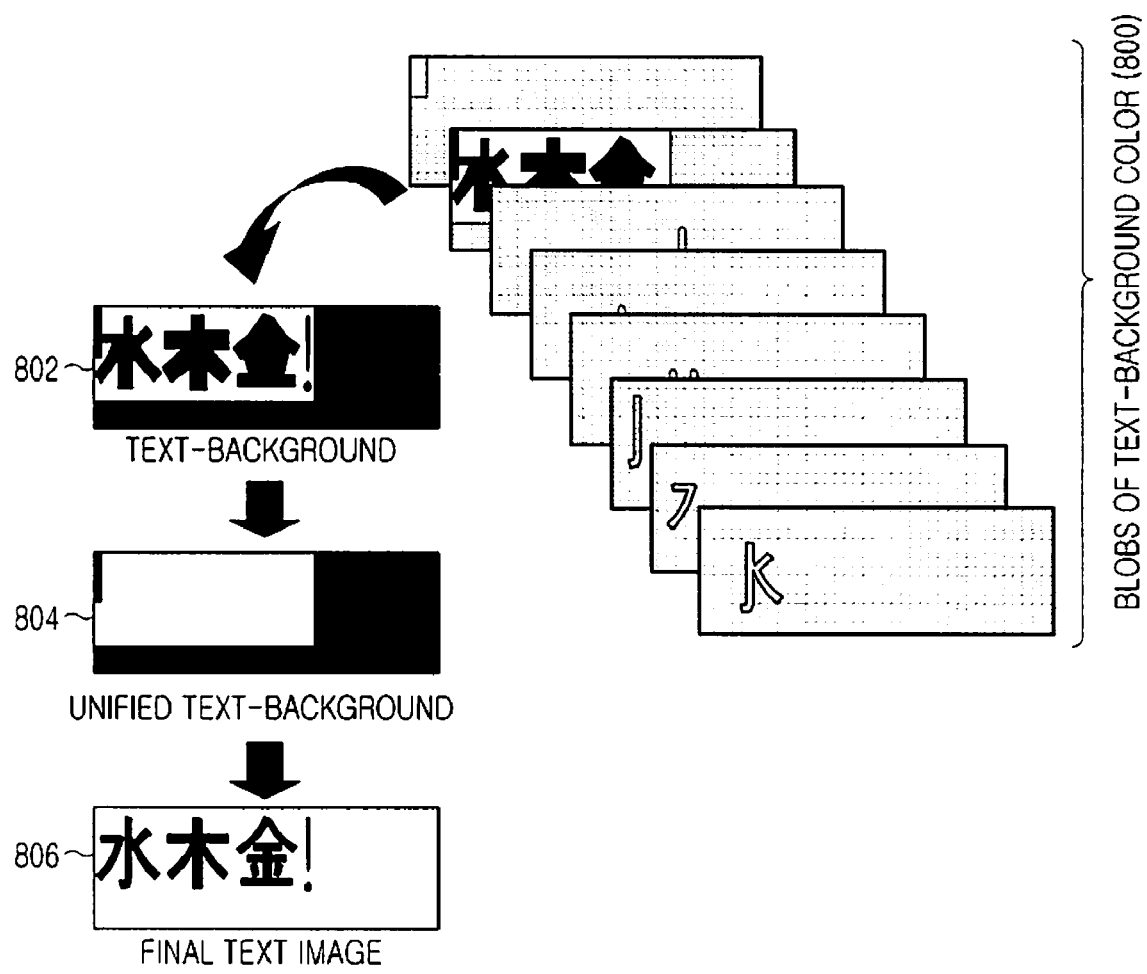
FIG. 8 illustrates the procedure of FIG. 7.

Referring to FIG. 7, the text recognition apparatus acquires blobs corresponding to text-background regions having the same color with the text-background color by using the text-background color in the quantized image in step 700. Thereafter, in step 710, the text recognition apparatus executes analysis for the blobs based on the positions and sizes thereof, and then in step 720, the text recognition apparatus searches text-background blobs among the blobs. Through this search, the text recognition apparatus determines the text-background region in step 730. That is, the blobs adjacent to the text region among the blobs are determined as the effective text-background region. Referring to FIG. 8, to describe this procedure in more detail, if the blobs 800 of the text-background color in the quantized image are collected, the collected blobs correspond to the text-background 802. If one or more blobs adjacent to the text region among the blobs are selected as the effective text-background region, a unified text-background 804 appears. Thereafter, the remaining non-text-background regions, i.e. indirect background regions, are filled with the text-background color, the non-text-background regions are removed, whereby the final text image 806 with text and a unified background are obtained.

As described above, the present invention provides a technical method for image pre-processing which automatically detects a text region included in an image while photographing the image in real time using a camera provided in a mobile communication terminal, and separates a text region and one or more background regions surrounding the text region, whereby erroneous recognition can be reduced and text recognition capability can be improved.

In addition, when a final text image is obtained, it is possible to provide the result of text recognition for the text image through the cooperation with an electronic dictionary. At this time, it is confirmed if the text image is inverted one, the text image is inversion-processed if the text image is determined as inverted one, and then the result of text recognition is output by executing text recognition. Like this, according to the present invention, the non-text regions are simplified so as to detect only a text region from the background regions surrounding the text region, whereby the text recognition capability can be improved, and the text recognition can be executed even for an inverted image.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for improving text recognition capability in a mobile communication terminal with a camera, the apparatus comprising:
   a text region detection unit which determines if text exists in an input image, determines text color and text-background color surrounding the text when the text is determined to exist, and unifies a background region beyond a text region into the determined text-background color;
   an inversion-processing unit which determines if the text image with the unified background is inverted, and inversion-processes the text image when the text image is an inverted image; and
   a text recognition unit which recognizes the inverted text image or the text image with the unified background from the inversion-processing unit, and then outputs the result of recognition.

2. The apparatus as claimed in claim 1, wherein the text region detection unit sets a center block with a predetermined size centering on a user guide marker movable by a user in the input image, and determines that the text exists if a number of edges acquired in the set center block exceeds a threshold value.

3. The apparatus as claimed in claim 2, wherein the text region detection unit sets a moving block with a predetermined size around the center block, seeks a histogram and edges by scanning of the moving block, and then determines the text-background color using a color value and a number of edges calculated through the analysis of the histogram.

4. The apparatus as claimed in claim 3, wherein the text region detection unit seeks the histogram of the center block, and determines the text color through analysis of the histogram of the center block.

5. The apparatus as claimed in claim 1, wherein the text region detection unit acquires blobs having a same color with the text-background color, analyzes the blobs based on positions and sizes thereof, searches text-background blobs among the blobs, thereby determining the text-background region, and unifies the regions except the text-background region into the text-background color.

6. The apparatus as claimed in claim 1, further comprising an electronic dictionary which stores translation data for texts, and provides a translation result for the recognized text in cooperation with the text recognition unit.

7. A method for improving text recognition capability in a mobile communication terminal with a camera, the method comprising the steps of:
   determining if text exists in an input image;
   determining text color and text-background color surrounding the text when the text is determined to exist;
   unifying background regions beyond a text region into the determined text-background color; and
   recognizing an inverted text image or text image with the unified background regions from an inversion-processing unit, and then outputting the result of recognition.

8. The method as claimed in claim 7, further comprising:
   determining if the text image with the unified background is inverted; and
   inversion-processing the text image if the text image is an inverted image.

9. The method as claimed in claim 7, wherein the step of determining if text exists comprises:
   setting a center block with a predetermined size centering on a moving block movable by a user in the input image; and
   determining that the text exists when a number of edges acquired within the set center block exceeds a threshold value.

10. The method as claimed in claim 9, wherein the step of determining the text-background color surrounding the text comprises:
    setting the moving block with the predetermined size around the center block;
    seeking a histogram and edges by scanning of the moving block; and
    determining the text-background color using a color value and the number of edges, calculated through analysis of the histogram.

11. The method as claimed in claim 9, wherein the step of determining text color comprises:
    seeking a histogram of the center block; and
    determining the text color through analysis of the histogram of the center block.

12. The method as claimed in claim 7, further comprising:
    acquiring blobs having a same color with the text-background color;
    analyzing the blobs based on positions and sizes thereof, and then searching text-background blobs among the blobs; and
    determining the text-background region through the search of the text-background blobs, and unifying the regions except the text-background region into the text-background color.

* * * * *